Jan. 7, 1930.  G. C. CARHART  1,742,804
FRICTION CLUTCH
Filed Jan. 5, 1926   2 Sheets-Sheet 2
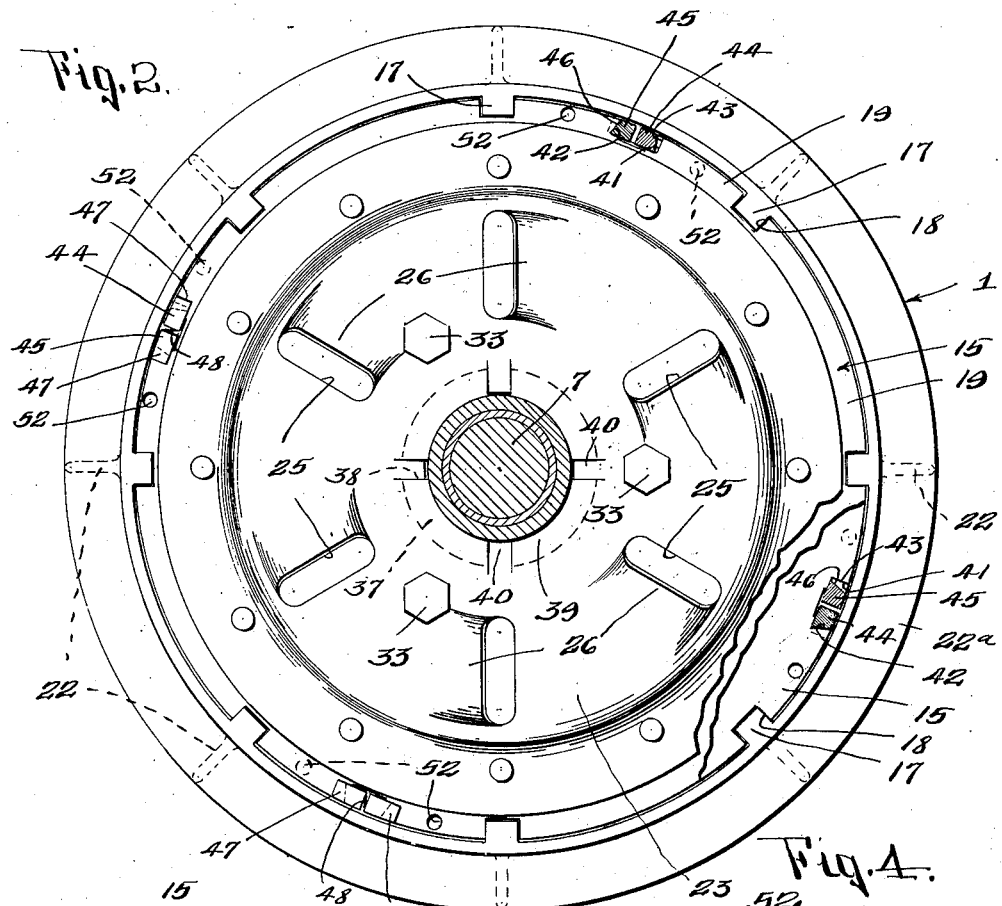
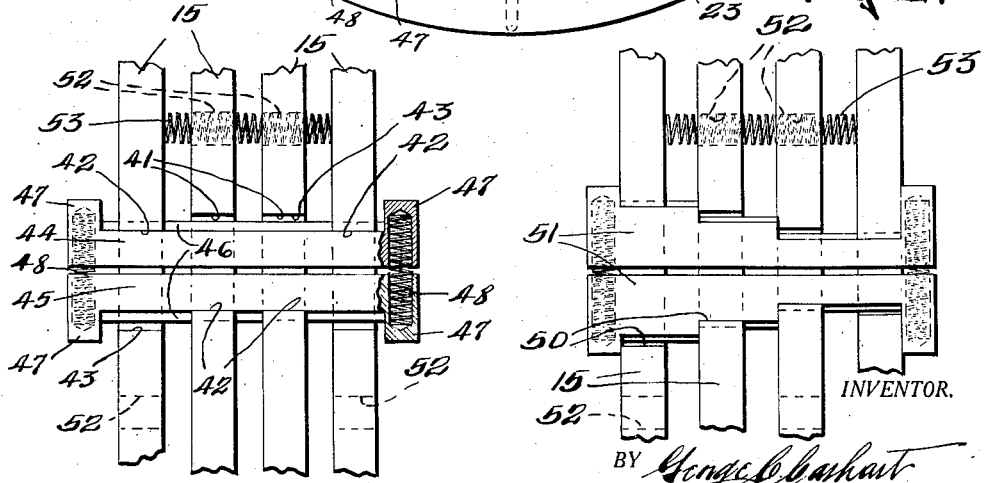

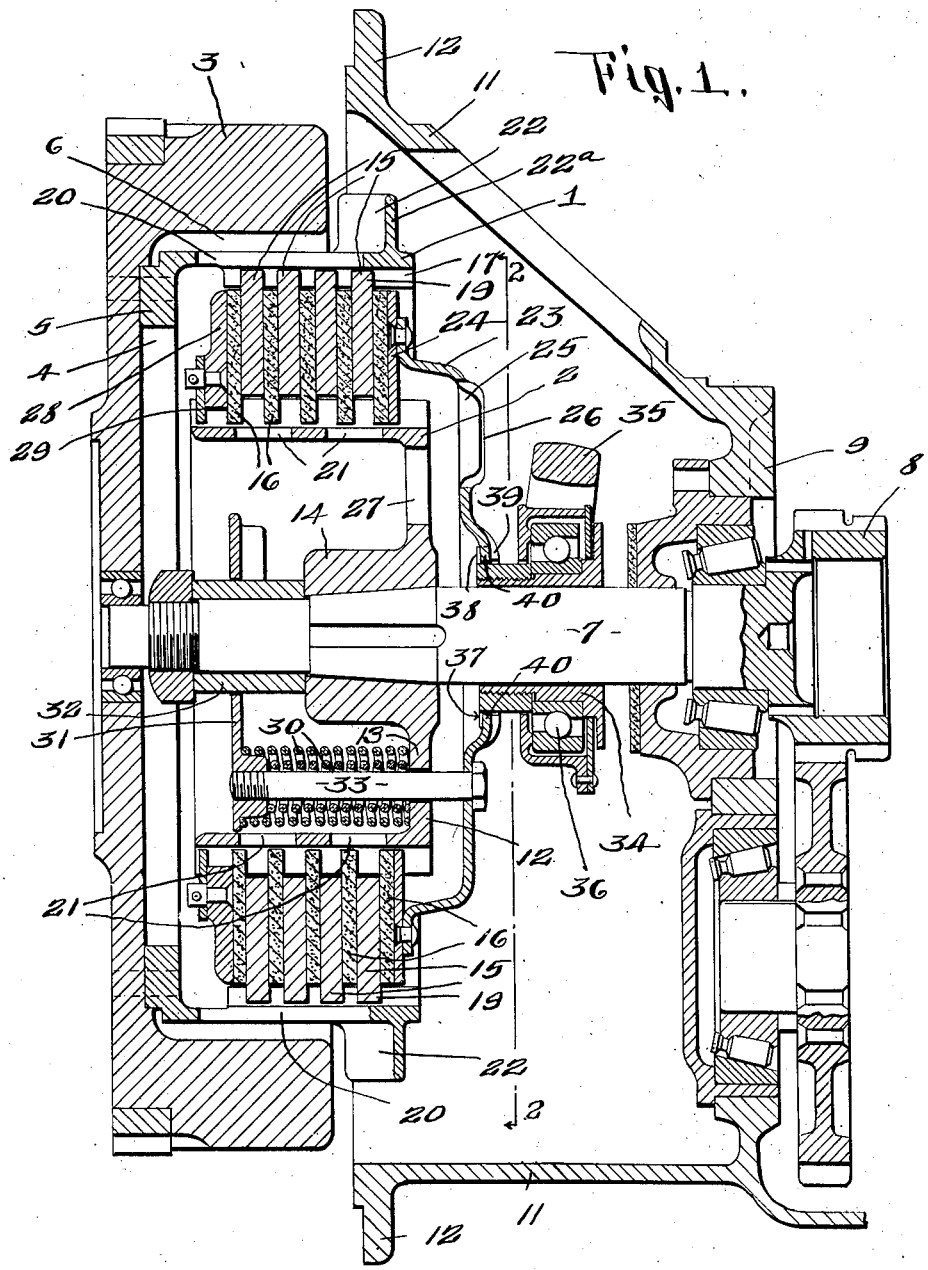

Patented Jan. 7, 1930

1,742,804

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

FRICTION CLUTCH

Application filed January 5, 1926. Serial No. 79,448.

This invention relates to friction clutches and has for its object a particularly simple and efficient construction whereby a multiple disk clutch of comparatively large capacity can be substituted in a single plate clutch situation; it further has for its object a clutch so constructed that air is circulated therethrough to cool the same. Another object, is means for tightening the disks of the clutch in their keyways or taking up the looseness between disks particularly metal disks and the drum with which they are interlocked so as to prevent rattling of the disks. It further has for its object means for separating the disks which means is built into or assembled into disks of one set.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of a clutch embodying my invention and contiguous parts.

Figure 2 is a cross sectional view taken on line 2—2, Figure 1, parts being omitted, of parts seen in Figure 1 showing the clutch in rear elevation.

Figure 3 is an enlarged edge view of one set of disks of the clutch showing the tightening means for the disks and the separating means.

Figure 4 is a view similar to Figure 3 of a modified form of tightening means.

This friction clutch embodies in its construction means for ventilating or passing a cooling current of air through the clutch between the friction surfaces or between the disks thereof when the clutch is released. It further includes means for taking up any looseness between the disks of one set and the drum with which they are interlocked, which looseness is present or developed between slidably interlocked projections and grooves on the drum or clutch member and on the set of disks interlocked therewith. The clutch further includes means by which a disk clutch of comparatively great capacity can be substituted in a situation intended for single plate clutches.

The clutch here illustrated comprises driving and driven members or outer and inner drums 1 and 2, sets of interleaved disks between said drums and interlocked respectively therewith, springs tending to hold the disks engaged, and operating or releasing means. The outer drum is connected to a suitable driver as the fly wheel 3 of the engine with which the clutch is associated, this fly wheel having a cylindrical recess 4 which is primarily intended for a single plate clutch. The drum 1 is also formed so as to provide ample space for a clutch of comparatively great capacity in the location intended for a single plate clutch of less capacity. The drum is here shown as formed with a base flange 5 which is secured in any suitable manner to the bottom of the recess 4. The cylindrical wall of the drum is spaced apart from the inner cylindrical wall of the recess 4 providing an annular space 6 around the outer drum. The inner drum 2 is mounted upon the shaft 7 of the clutch, which shaft is usually the stem of a stem gear 8 forming part of the change speed transmission gearing, this shaft 7 being journalled in suitable bearings in the front wall 9 of the case of the gearing and having a pilot bearing in the fly wheel. Said wall is also formed with a clutch housing 11 which is secured to the housing for the fly wheel in any suitable manner as by screws passed through a marginal flange 12 on the housing 11, which flange laps a flange on the fly wheel housing, all as will be understood by those skilled in the art.

The drum 2 is formed with a head 13 at its rear end and has a hub 14 on the shaft 7 and the cylindrical wall is supported at one end on this head or web 13.

15 and 16 are respectively sets of interleaved disks interlocked with the outer drum 1 and the inner drum 2, the outer drum being formed with projections or internal teeth 17 at spaced apart intervals on its inner face, and the disks 15 having grooves 18 complemental to the projections 17 and outward projections 19 between said grooves, slidably fitting the spaces between the internal teeth or projections 17. The periphery of the drum 2 and the set of disks 16 are similarly formed with slidably interlocked projections.

The disks 16 are preferably of a fibrous material while the disks 15 are of metal.

Both the drums 1 and 2 are formed with passages 20 and 21 through their cylindrical walls. The means for passing a cooling current of air through the clutch and the drums causes the air to pass through these passages, or in other words, the passages are provided in order that a current of air may be passed through the drums and between the friction disks when the clutch is released. Preferably, both the inner and outer drums have means associated therewith for creating such current of air, the outer drum having suction means and the inner drum blowing means. As here illustrated, the outer drum extends outside of the recess 4 in the fly wheel to the rear of the fly wheel and it is provided on such projecting portion with vanes or blades 22, which act as a centrifugal fan and tend to draw the air through the passages 20 and 21 and the annular space 6. The blades project from the drum 1 on an annular flange 22$^a$ on the drum 1.

The inner drum 2 has means for blowing the air therethrough and acting in conjunction with the vanes 22, such means being provided on the back plate 23 for the inner drum, this back plate 23 being the web of the pressure ring or disk 24 which coacts with the disks 15, 16 to compress them. The web or back plate 23 is formed with openings 25 at intervals and with a vane or scoop 26 at one side of each opening arranged to force or scoop the air through the openings 25 into the interior of the head 13 and through openings 27 in such head. Obviously, as the clutch rotates, air will be forced through the openings 25 and 27 of the back plate and the drum 2 through the drum out the rear end thereof, and out through the passage 20 and space 6, such current of air being created both by the vanes 22 and the scoops 26.

When the clutch is thrown out and the fly wheel is in motion air will be drawn by the vanes 22 through the openings 26, 27 passages 21 between the disks and out through the openings 20, annular space 6 of the recess 4 and out through the rear end of the recess.

The disks 15, 16 are compressed by the pressure ring 24 against an abutment 28 at the front end of the inner drum, this abutment being held by a retaining ring 29 of any suitable construction. The manner in which this abutment ring 28 is fixed in position is not necessary to the understanding of this invention and this abutment may be fixed in position in any well known manner. The springs for holding the clutch engaged may be arranged in any well known manner, three sets of springs 30 being here shown, these springs being interposed between the head 13 of the inner drum and a spring abutment 31 located within the inner drum and slidably mounted on the shaft 7 or a sleeve 32 thereon, these springs encircling pull rods or bolts 33 extending through the back plate or web 23 through holes in the head 13 and threading into the abutment, the heads of the screws overlying the back plate 23. Obviously, the thrust of the springs to the left, Fig. 1 against the abutment 31 pulls the web 23 of the pressure disk 24 to compress the disks 15, 16 toward the disk abutment 28. As there are three bolts 33 the abutment 31 is spider shaped to conform to the shape of the abutment.

The clutch is operated to release the disks, by means of a throw out collar 34 of any suitable construction, slidable on the shaft 7 and operable by a yoke or fork 35 which in turn is operated by the usual clutch pedal, the yoke or fork 35 thrusting against an antifriction throw-out bearing 36 associated with the throw-out collar 34. This throw-out collar 34 is connected in any suitable manner to the pressure disk 24 or the web 23 thereof and as here shown, the throw out collar is formed with a flange 37 having notches 38 therein and the web 23 extends back of said flange 37 at 39 and has tongues 40 struck therefrom which are pressed into the notches 38. Thus, rearward movement of the throw-out collar to release the clutch causes the flange 37 to pull against the web 23 and pull the pressure disk 24 away from the friction disks 15, 16 permitting such disks to release. The tongues merely interlock the web 23 with the collar 34 so that the collar 34 rotates with the disk 23.

The means for tightening the disks or taking up looseness in one set thereof, comprises means individual to such set and exclusive of the other set and tending to thrust some of the disks of the set in one direction about their axis and the other disks of the same set in the opposite direction. As the disks 16 are of fibre, looseness between them and the inner drum is of no consequence as the disks being of fibre, no noise or rattle will result from slight looseness. However, the metal disks 15 which in this embodiment of my invention are shown as interlocked with the outer drum, will rattle and be noisy if there is undue looseness between the projections and grooves thereof and the projections and grooves of the outer drum. Therefore, the disk tightening means is provided in connection with the metal disks.

As here illustrated, this tightening means comprises transverse notches 41 formed in the projections 19 outside of the peripheries of the disks 16, thrust members or bars lying in such notches and springs tending to actuate the thrust members in opposite directions. The notches are so formed that if one thrust member is engaged with one side wall of the notch, the other thrust member is spaced apart from the opposite side wall of the notch of the same disk, and as here shown each notch is formed with a beveled or undercut face 42 on one side thereof and a straight face 43 on the other. That is, a face that is not beveled; and the thrust members 44, 45 which lie in said grooves are provided with beveled faces 46 for thrusting against the beveled faces 42. Some of the disks are arranged so that the beveled faces 42 thereof are in alinement while the remainder of the disks are arranged so that their beveled faces are out of alinement with the beveled faces of the first disks. That is, some of the disks are reversely arranged with respect to the others as seen in Figure 3. The thrust members 44, 45 are provided with heads 47 at their ends located outside of the disks. These heads are formed with sockets in which springs 48 are arranged which tend to thrust the members 44, 45 apart, thrusting one of said members into engagement with the beveled faces of some of the disks as the two inner disks, and thrusting the other member into engagement with the beveled faces of the remainder or outer disks. Thus the two inner disks are thrust by the springs 48 in one direction or downwardly in Figure 3 and the two outer disks are thrust in the opposite direction or upwardly, Figure 3, and thereby causing one end or the other of the projections 19 to engage without looseness, one side or the other of the internal projections or teeth 17 of the outer drum.

In the construction shown in Figure 3, the disks 15 can be formed as exact duplicates and some of them reversed with respect to others when they are placed in the clutch in order to properly cooperate with the thrust members 44, 45.

However, as seen in Figure 4, the disks are not exact duplicates in that each disk has a groove 50 corresponding to the groove 41 of Figure 3 of different width than the grooves 50 of the other disks and the thrust members 51 are correspondingly shaped. However, in the construction shown in Figure 4, the thrust members 51 have beveled faces on opposite sides thereof and the groove 50 of each disk is undercut or beveled on one side only, and the disks are arranged with respect to the alinement of such beveled faces the same as in the construction shown in Figure 3.

The means contained or inherent in the set of disks for separating them as here shown comprises passages 52 formed in some of the projections 19 and located at one side of the center of said projections and in arranging the disks, the inner disks are arranged with these passages 52 in alinement while the outer end disks are reversely arranged so that the passages are not in alinement with those of the inner disks, and a spring 53 is arranged in such passages 52 and thrusts at its ends against the projections 19 of the outer disks. There are several of these springs 53 spaced apart at proper intervals.

In operation, obviously, when the throwout collar is operated to pull back the pressure plate or disk 24, the springs 53 will separate the two outer disks and permit the inner disks to separate thus quickly releasing the clutch. In so far as this separating feature is concerned, the outer disks need not be provided with passages 52 but for the purpose of manufacturing in order that duplicate disks may be used, all of them are formed with such passages and those of the outer disks rendered ineffective by reversing the disks relatively to the inner disks.

In operation during rotation of the clutch, a continuous current of air is passed through the clutch by the scoops 26 through the passages 27, 20, annular space 6 and out through the rear end of the recess 4 in the fly wheel, the air being forced by the centrifugal vanes 22 and the scoops 26. When the clutch is released, the centrifugal fan blades 22 draw the air through the openings 25, 27, 21 between the clutch disks out through the passages 20 and 6. Any looseness and rattling is taken up automatically by the spring pressed thrust members or bars 44, 45 and the clutch quickly released and any binding effect that may be due to these take up members 44, 45 is more than compensated for by the springs 53 which separate the clutch disks when the clutch is released.

Owing to the space between the outer drum 1 and the cylindrical wall of the recess in the fly wheel, which space is open at its rear end due to the fact that the drum is secured at its inner end to the fly wheel or the bottom of the cylindrical recess, the cooling of the outer drum is provided for, particularly when the drum is formed with passages as 20. This cooling feature is present regardless of whether or not any means as the vanes 22 or 26 are provided for positively circulating the air.

What I claim is:

1. In a clutch, outer and inner drums and sets of interleaved friction disks associated respectively with said drums, the drums being formed with air passages, means associated with the inner drum for circulating air through the drums, said means forming a back plate for the inner drum.

2. In a clutch, outer and inner drums and sets of interleaved friction disks slidably interlocked respectively with said drums, the drums being formed with air passages, means associated with the inner drum for circulating air through the drums, said means forming a back plate for the inner drum, the back plate being formed with openings and blades arranged to force the air through the passages during the rotation of the clutch.

3. In a clutch, outer and inner drums and sets of interleaved disks slidably interlocked respectively with said drums, the drums being formed with air passages, means for operating the disks comprising a pressure ring having a web forming the back plate of the clutch, said back plate being formed with means for forcing air through the drums and said passages during the rotation of the clutch.

4. A disk clutch comprising inner and outer driving and driven members and sets of interleaved disks slidably interlocked respectively with said members, and means associated with one set of disks and interposed between some of the disks of the set and other disks of the same set and tending to force some of the disks of said set in one direction about their axes and the other disks of said set in the opposite direction whereby looseness is taken up between such disks and the member with which they are slidably interlocked.

5. A clutch comprising inner and outer drums formed with lengthwise keyways on their opposing faces, sets of interleaved disks having projections extending into the keyways of the drums respectively and means associated with the projections of one set of disks and interposed between some of the disks of the set and other disks of the same set and tending to thrust some of the disks of said set in one direction about the axis of the disks and the other disks of said set in the opposite direction thereby taking up looseness between the projections of such set of disks and the keyways of the drum with which they are interlocked.

6. A clutch comprising inner and outer drums formed with lengthwise keyways in their opposing faces, sets of interleaved disks having projections slidably interlocked with the keyways of the drums respectively, the projections of one of said sets being formed with transverse alined grooves, thrust bars arranged in the grooves, one thrust bar being arranged to thrust against the corresponding sides of the grooves of some of the disks and the other bar arranged to thrust against the opposite sides of the grooves of the other disks, and springs tending to force the bars apart.

7. The clutch construction of claim 6 in which the transverse alined grooves of the disks are each formed with an undercut wall on one side and a straight wall on the other side and the undercut walls of some of the disks are arranged on the same side of the grooves as the straight walls of other disks and the thrust bars having beveled edges complementary to those of the undercut walls of the grooves.

8. The combination of a fly wheel having a cylindrical recess, a clutch comprising outer and inner drums and sets of interleaved disks interposed between the drums and slidably interlocked therewith, the outer drum having a base flange secured to the bottom of the recess and the cylindrical wall of the outer drum being spaced apart from the outer wall of the recess and also extending outside of the recess and the outer and inner drums being also formed with air circulating passages and the outer drum being formed with vanes on the portion thereof located outside of the recess for circulating air between the drums, the recess and the disks.

9. A clutch comprising a fly wheel formed with a cylindrical recess, an outer drum having a base flange mounted on the bottom of the recess, the drum extending to the outside of the recess and being spaced apart from the annular wall of the recess, an inner drum having its inner end spaced apart from the bottom of the recess and sets of interleaved disks slidably interlocked respectively with the drums, the outer and inner drums being formed with passages therethrough and means for circulating air through the recess of the fly wheel, through the drums and said passages and between the disks.

10. The combination of a fly wheel formed with a cylindrical recess and a clutch comprising an outer drum mounted in the recess, the outer drum being secured at its inner end to the fly wheel and spaced apart from the cylindrical wall of the recess providing an annular air space open at the rear end of the recess for the circulation of air, an inner drum, sets of interleaved disks interlocked respectively with the drums and means for compressing and releasing the disks, the outer drum and the inner drum being provided with air passages therethrough.

11. The combination of a fly wheel formed with a cylindrical recess and a clutch comprising an outer drum mounted in the recess, the outer drum being secured at its inner end to the fly wheel and spaced apart from the cylindrical wall of the recess providing an annular air space open at the rear end of the recess for the circulation of air, an inner drum, sets of interleaved disks interlocked respectively with the drums and means for compressing and releasing the disks, the outer drum being provided with passages through its annular wall and the inner drum being open at its rear end and having inlet openings for air at its front end.

12. The combination with a fly wheel having a recess opening through its rear face, of a clutch comprising outer and inner drums, sets of interleaved disks interlocking respectively with the drums, a shaft on which the inner drum is mounted, spring means for compressing the disks and throw-out means for relieving the disks of the pressure of the spring means, the outer drum being located within the recess and being spaced apart from the annular wall thereof, and having a bottom secured to the bottom of the recess, the outer drum being formed with passages through its annular wall, the inner drum having its inner end spaced apart from the bottom of the outer drum, the inner drum having air passages therethrough.

13. The combination of a fly wheel having a recess opening through its rear face, of a clutch comprising outer and inner drums, sets of interleaved disks interlocking respectively with the drums, a shaft on which the inner drum is mounted, spring means for compressing the disks and throw-out means for relieving the disks of the pressure of the spring means, the outer drum being located within the recess and spaced apart from the annular wall thereof and secured at its inner end within the recess, the outer drum being formed with passages through its annular wall, the inner drum being formed with a web having air passages therethrough and the spring means including a back pressure plate having air passages therethrough, the inner drum having its inner end spaced apart from the bottom of the recess and the outer drum.

In testimony whereof, I have hereunto signed my name, at Syracuse, in the county of Onondaga, and State of New York, this 22nd day of Dec., 1925.

GEORGE C. CARHART.